ered with my improved
UNITED STATES PATENT OFFICE.

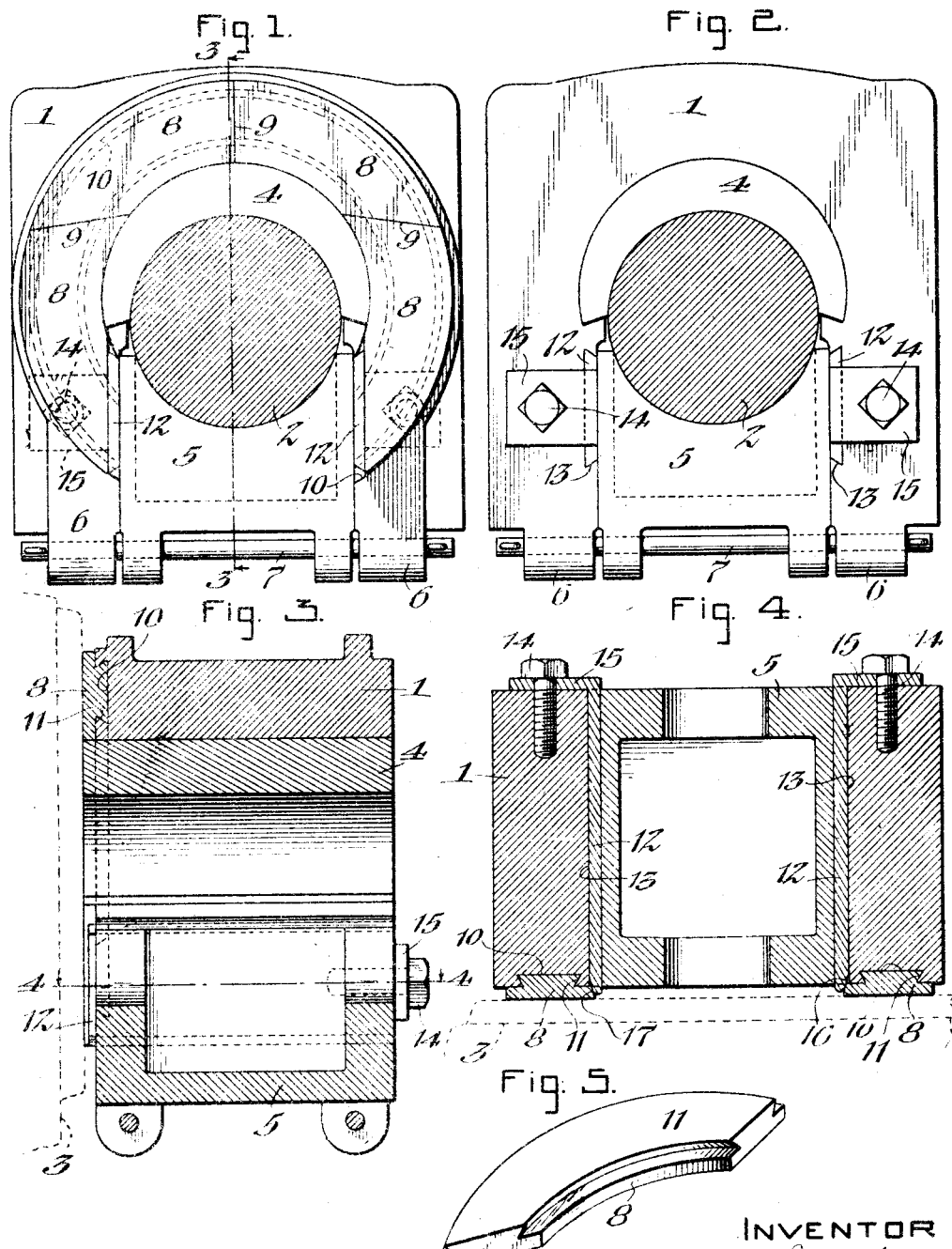

ALBERT A. JUNKER, OF BUFFALO, NEW YORK.

DRIVING-BOX FOR LOCOMOTIVES.

1,201,309.  Specification of Letters Patent.  Patented Oct. 17, 1916.

Application filed April 22, 1916. Serial No. 92,849.

*To all whom it may concern:*

Be it known that I, ALBERT A. JUNKER, a citizen of the United States, residing at Buffalo, in the county of Erie and State of New York, have invented new and useful Improvements in Driving-Boxes for Locomotives, of which the following is a specification.

This invention relates to the wear plates or so-called "liners" used on the journal or driving boxes of locomotives, trucks and trailers and adapted to take up the lateral or lost motion between said boxes and the wheels.

It is the object of this invention to so construct the wear plate or liner that it will eliminate entirely the necessity of dropping or removing the axle and wheels from the box in repairing or renewing the liner.

A further object is to improve such wear plates with a view of securing greater economy and ready application and renewal thereof.

In the accompanying drawings: Figure 1 is a front or outside view of a locomotive driving box equipped with my improved liner. Fig. 2 is a rear view thereof. Fig. 3 is a vertical section on line 3—3, Fig. 1. Fig. 4 is a horizontal section on line 4—4, Fig. 3. Fig. 5 is a perspective view of a segment of the liner.

Similar characters of reference indicate corresponding parts throughout the several views.

The driving box equipped with my improved liner is similar to those ordinarily employed in connection with the axles and wheels of locomotives, trucks, trailers and the like, except as hereinafter described. As shown in the drawings, the box comprises a body 1, having the usual opening for receiving the axle 2 on which the wheel 3, shown by dotted lines, is mounted. 4 is the usual brass or bearing piece resting on the axle, and 5 the customary lubricating cellar, normally occupying the space below the axle. As is customary in driving boxes of this character, the cellar is removably secured between the downward extensions 6 of said box by means of bolts or pins 7.

Removably secured to the front or outer face of the driving box is my improved wear plate or liner, which preferably consists of a plurality of curved plates or segments 8 made of steel, bronze, brass or other appropriate material, the joints of which are shown at 9. Any suitable means may be employed for removably securing this segmental liner to the driving box, but the preferred construction is that shown in the drawings. The outer face of the box is provided with a dove-tailed arcuate groove or guideway 10 which is curved substantially concentrically with the axle and extends to the opening in the bottom of the driving box in which the cellar is located. The liner is provided on its inner face with correspondingly dovetailed tenons or projections 11 which slidably fit in said groove and are adapted to slide circumferentially therein to permit their insertion and removal. The liner illustrated in the drawings is composed of four segments or sections but may be made of a greater or less number if desired. These segments are tightly held in place in the companion groove by means of two dovetail keys or holding plates 12 adapted to engage correspondingly dovetailed grooves or key ways 13 arranged on opposite sides of the bottom-opening of the driving box. Each of these keys is held securely in place by means of a clamping bolt 14 passing through a flange or ear 15 at the inner end of the key and threaded into an opening in the adjacent portion of the box-body. The opposite end of each key is beveled or chamfered, as shown at 16, while the opposing inner edges of the two lowermost sections 8 of the liner are correspondingly beveled, as shown at 17, so that upon driving the keys home and tightening the bolts 14, the lowermost sections are wedged against the contiguous segments of the liner, thereby firmly and tightly holding them in place in the groove 10, and also preventing their vertical displacement therein. By this manner of retaining the segmental liner in place, any possibility of vibration is avoided.

After the liner is assembled, the outer face thereof may be covered with a layer of Babbitt metal, not shown in the drawings, the object of which is to prevent undue friction and wear between the hub of the wheel and the face of the liner.

When it becomes necessary to remove the liner for repairs or renewal, the lubricating cellar is removed by withdrawing the pins 7, releasing the keys 12 and withdrawing them out of the path of the liner segments. The latter are then removed downwardly through the bottom-opening of the box-body in an obvious manner, thus avoiding the necessity of dropping the wheels and axle, which operation involves considerable loss of time and delay. In assembling the liner, the operations above mentioned are simply reversed.

This improvement can readily be applied to the existing driving-boxes of locomotives and the like by simply providing the necessary grooves for receiving the liner and the holding or clamping keys. This can be done at small cost, in comparison with the saving of time effected by the use of the improved liner.

I claim as my invention:

1. The combination with a driving box having a bottom-opening for the axle and the lubricating cellar and provided in its face with an arcuate guideway terminating at said opening, a liner composed of sections slidable lengthwise in said guideway and removable therefrom through said opening, and means for retaining the liner-sections in said guideway.

2. The combination with a driving box having a bottom-opening for the axle and the lubricating cellar and provided in its face with an arcuate guideway terminating at said opening, a liner composed of sections slidable lengthwise in said guideway and removable therefrom only by longitudinal movement of the sections into said opening, and means for retaining said sections in the guideway.

3. The combination with a driving box having a bottom-opening for the axle and the lubricating cellar and provided in its face with an arcuate guideway terminating at said opening, a liner composed of sections slidable lengthwise in said guideway and abutting at their ends, and clamping means at the ends of said guideway acting upon the lowermost liner-sections.

4. The combination with a driving box having a bottom-opening for the axle and the lubricating cellar and provided in its face with an arcuate guideway terminating at said opening, a liner composed of sections slidable lengthwise in said guideway, and transverse retaining keys extending across the ends of said guideway.

5. The combination with a driving box having a bottom-opening for the axle and lubricating cellar and provided in its outer side with an undercut arcuate groove, the ends of said groove terminating at opposite sides of said opening, of a liner composed of sections provided with tongues curved to fit said groove and slidable lengthwise therein, and means for retaining said liner-sections in place.

6. The combination with a driving box having an undercut arcuate groove in its outer side, of a sectional liner having a tongue adapted to engage said groove, and retaining plates extending transversely of the driving box at the ends of said groove.

7. The combination with a driving box having a groove arranged circumferentially in its outer side and transverse grooves arranged at the ends of the first-named groove, of a liner composed of curved segments provided on their inner sides with tongues adapted to slide in said circumferential groove, and holding plates arranged in said transverse grooves for retaining said liner segments in place.

8. The combination with a driving box having a bottom-opening for the axle and the lubricating cellar, a dovetailed groove in the outer side of said box substantially concentric with the axle and terminating at said opening and dovetail-grooves arranged transversely at the ends of the first-named groove, of a sectional liner having a correspondingly dovetailed-tongue seated in said concentric groove, and holding keys removably arranged in said transverse grooves for retaining said liner sections in place.

9. The combination with a driving box having a bottom-opening for the axle and the lubricating cellar, a dovetail-groove in the outer side of said box substantially concentric with the axle and transverse grooves at the ends of the first-named groove, of a liner removably arranged in said groove and comprising a plurality of curved segments each having a correspondingly dovetailed tongue slidably in said concentric groove, the two lowermost sections of the liner being beveled at their outer edges, and clamping keys arranged in said transverse grooves and having beveled portions adapted to wedge against the corresponding portions of the lowermost liner-sections.

ALBERT A. JUNKER.